United States Patent Office 2,966,509
Patented Dec. 27, 1960

2,966,509

NEW PHENACYLAMINES AND PROCESS

Charles H. Stammer, Clark, N.J., assignor to Merck & Co., Inc., Rahway, N.J., a corporation of New Jersey No Drawing. Filed Apr. 29, 1958, Ser. No. 731,620

10 Claims. (Cl. 260—463)

This invention relates to new substituted phenacylamines, methods of preparing these compounds, and methods of converting these compounds to substituted coumarin compounds. More particularly, it is concerned with new diacyl derivatives of 2,4-dihydroxy-3-methylphenacylamine, methods of preparing these compounds, and methods of converting these compounds to N-acyl derivatives of 3-amino-4,7-dihydroxy-8-methylcoumarin.

The acyl derivatives of 3-amino-4,7-dihydroxy-8-methylcoumarin prepared in accordance with the processes of the present invention are valuable intermediates in the synthesis of novobiocin and dihydronovobiocin.

It is an object of this invention to provide new N-acyl-2-hydroxy-3-methyl-4-acyloxyphenacylamines and methods of preparing these compounds. Another object is to provide methods for the conversion of these compounds to 3-acylamido-4,7-dihydroxy-8-methylcoumarin. Other objects will be apparent from the detailed description of the invention hereinafter provided.

In accordance with the present invention, it is now found that 3-acylamido-4,7-dihydroxy-8-methylcoumarin can be prepared from 2,4-dihydroxy-3-methylphenacylamine by reactions which may be shown as follows:

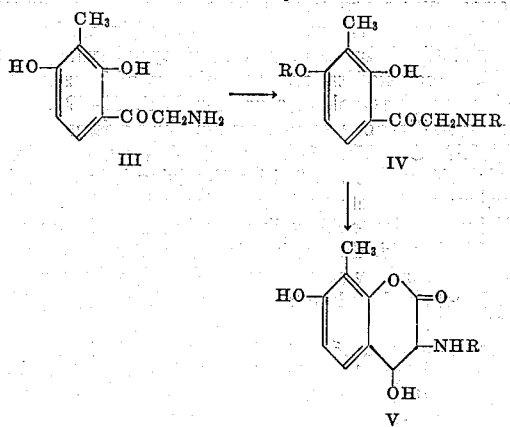

wherein R represents an acyl group.

In this process the starting material 2,4-dihydroxy-3-methylphenacylamine (III), is reacted with an acylating agent to form the diacyl derivative (IV) which is then reacted with a lower alkyl carbonate in the presence of an alkali metal to produce 3-acylamido-4,7-dihydroxy-8-methylcoumarin (V).

The first step of this process is effected by intimately contacting the starting material with a suitable acylating agent such as an acid anhydride or acid halide to produce the diacylated compound. Thus, this reaction is conveniently carried out by reacting the phenacylamine with an acid chloride in the presence of an acid acceptor. Alternatively, the reaction can be effected by intimately contacting the phenacylamine with an acid anhydride in the presence of an acid acceptor. Although various bases are suitable for use as acid acceptors in these acylation processes, the tertiary amines such as diethylamino benzene, pyridine, and the like are particularly suitable, and the use of such acid acceptors is preferred in carrying out the processes of my invention. Various acylating agents can be used in this process, but I prefer to use those of organic carboxylic acids having from 2-14 carbon atoms. Thus, the lower fatty acid acylating agents can be used or benzoic acid and substituted benzoic acid acylating agents can be used in this process. In particular, the substituted benzoic acid halides, 4-acetoxy-3-(3-methyl-2-butenyl)-benzoyl chloride and 4-acetoxy-3-(3-methylbutyl)-benzoyl chloride are especially useful in the process of my invention since the resulting acyl derivatives of the coumarin compound are valuable intermediates useful in the synthesis of novobiocin and dihydronovobiocin.

In carrying out the reaction, I find that the acylation is most conveniently effected by intimately contacting the acylating agent and the acid acceptor with the phenacylamine at room temperature for sufficient time, for example, overnight, to complete the formation of the desired diacylated phenacylamine. After the reaction is complete, the product can be recovered by evaporating the reaction mixture to dryness and crystallizing the residue from a suitable solvent such as ethyl acetate. The acid acceptor such as diethylaminobenzene or pyridine is a convenient solvent for carrying out the reaction and at the same time acts as an acid acceptor for the by-product of the reaction.

The second step of my process, the formation of the coumarin compound, is accomplished by reacting the diacylated phenacylamine derivative with a lower alkyl carbonate in the presence of an alkali metal. In this reaction any of the various lower alkyl carbonates such as methyl carbonate, ethyl carbonate, propyl carbonate, and the like can be used, atlhough I prefer to use ethyl carbonate which is readily available and acts as a good solvent for carrying out the reaction. Further, I prefer to use powdered sodium as the alkali metal in this reaction since it is relatively inexpensive and most convenient to use.

The reaction is conveniently effected by warming a solution of the diacylated phenacylamine in ethyl carbonate in the presence of sodium for a short time, destroying any excess of sodium by the addition of lower alkanol such as methanol or ethanol, extracting the reaction mixture with water and acidifying the resulting alkaline aqueous extract whereupon the desired coumarin compound precipitates from solution.

The acylated coumarin compounds obtained by the processes of the present invention can be used as intermediates in the synthesis of novobiocin and dihydronovobiocin in accordance with the processes described in the co-pending application of Edward Walton and Claude Spencer Serial No. 705,139, filed December 26, 1957. Thus, when 3-[4-hydroxy-3-(3-methyl-2-butenyl)-benzamide-4,7-dihydroxy-8-methylcoumarin and 3-[4-hydroxy-3-(3-methylbutyl)-benzamido]-4,7-dihydroxy-8-methylcoumarin, which can be prepared as described above, are reacted with 1-chloro-2-O-acyl-3-O-carbamyl-noviose in the presence of silver oxide, and the resulting reaction products are hydrolyzed, novobiocin and dihydronovobiocin respectively are obtained. This process can be shown as follows:

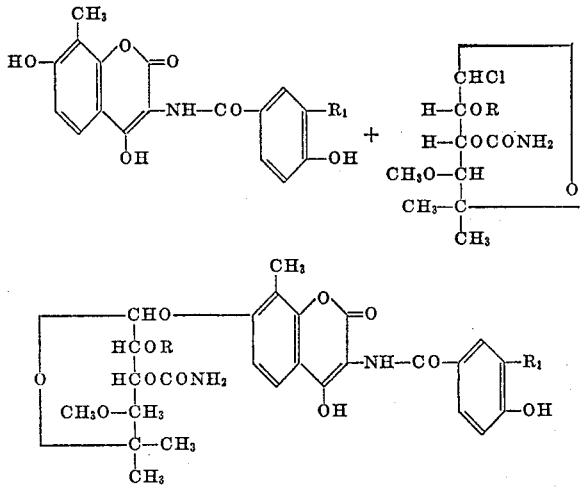

wherein R is an acyl group and $R_1$ is

—$CH_2$—CH=C($CH_3$)$_2$ or —$CH_2$—$CH_2$CH($CH_3$)$_2$.

Other acylated derivatives of 3-amino-4,7-dihydroxy-8-methylcoumarin obtained in accordance with the processes of the present invention can be hydrolyzed in acidic solutions, for example, in aqueous acids, or preferably in methanolic hydrochloric acid to obtain the free amine. This free amine, 3-amino-4,7-dihydroxy-8-methylcoumarin, can then be used as intermediates in the synthesis of novobiocin and dihydronovobiocin in accordance with the procedures described in the application of Edward Walton and Claude F. Spencer referred to above.

The starting material, 2,4-dihydroxy-3-methylphenacylamine, can be prepared in accordance with detailed procedure described in my co-pending application Serial No. 731,614, filed April 29, 1958. Thus, this compound can be prepared from 3-methyl-resacetophenone by the following reactions:

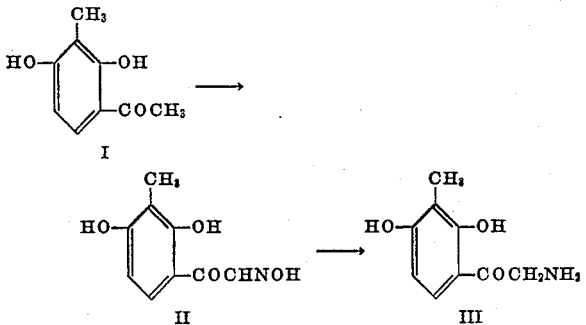

In this process the acetophenone compound is reacted with an alkali metal nitrite and the resulting reaction product is acidified to produce the oximino acetophenone which upon reduction of hydrogen in the presence of palladium activated carbon and a small amount of hydrohalic acid is converted to the desired phenacylamine.

The following examples are presented as illustrative embodiments of the processes of the present invention.

EXAMPLE 1

*Preparation of N-[4-acetoxy-3-(3-methyl-2-butenyl)-benzoyl]-2-hydroxy-3-methyl-4-(4-acetoxy-3-[3 - methyl-2-butenyl]-benzoyloxy)-phenacylamine*

To a cold solution of 5.4 g. of 4-acetoxy-3-(3-methyl-2-butenyl)-benzoyl chloride in 25 ml. of pyridine is added 2.2 g. of 2,4-dihydroxy-3-methylphenacylamine hydrochloride. The mixture is allowed to come to room temperature and evaporated to dryness in vacuo. The addition of water to the residue gives a slurry of solid which is collected on a filter. Recrystallization of this product from ethyl acetate gives N-[4-acetoxy-3-(3-methyl-2-butenyl)-benzoyl]-2-hydroxy-3-methyl-4-(4-acetoxy-3-[3-methyl-2-butenyl]-benzoyloxy)-phenacylamine as a crystalline solid.

The 4-acetoxy-3-(3-methyl-2-butenyl)-benzoyl chloride used in the above described process can be prepared as follows:

A mixture of 7 g. of sodium metal cut into small pieces, 300 ml. of dry toluene, and 50 g. of ethyl p-hydroxybenzoate is heated under reflux and stirred for a few hours. The mixture is cooled in an ice bath and stirred while 50 g. of γ,γ-dimethylallyl bromide is added dropwise during a period of two hours. The reaction mixture is stirred for fifteen hours at room temperature and then warmed to 50° C. for one-half hour. After filtration to removed sodium, the toluene solution is concentrated under reduced pressure to 100 ml. and extracted three times with 100 ml. portions of 2.5 N sodium hydroxide. The alkaline extracts are combined, cooled to 0° C. and carefully acidified to pH 6 with 2 N sulfuric acid. The heavy oil which separated is extracted with ether, dried over magnesium sulfate and concentrated in vacuo; weight 42 g. This oil is dissolved in cyclohexane and extracted with a saturated solution of sodium carbonate to remove some unreacted ethyl p-hydroxybenzoate. The cyclohexane layer is dried over magnesium sulfate and concentrated in vacuo. The residue is dissolved in a boiling mixture of equal parts of cyclohexane and petroleum ether (B.P. 30–60°). After cooling at room temperature for a few hours and 3° overnight, the colorless prisms are collected on a filter; M.P. 62–66°. Recrystallization from a mixture of cyclohexane and petroleum ether (B.P. 30–60° C.) gives 18.9 g. of ethyl 3-(3-methyl - 2 - butenyl) - 4 - hydroxy benzoate colorless prisms; M.P. 66–69° C.

A solution of 7 g. of ethyl 3-(3-methyl-2-butenyl)-4-hydroxybenzoate in 30 ml. of 4 N sodium hydroxide is heated on the steam cone for four hours. After cooling in an ice bath, the resulting solution of the sodium salt of 3-(3-methyl-2-butenyl)-4-hydroxybenzoic acid is acidified with dilute hydrochloric acid and extracted with ether. The combined ether extracts are washed with water, dried over magnesium sulfate, filtered, and concentrated in vacuo. The residue is dissolved in hot benzene and crystallized by slowly adding cyclohexane; M.P. 80–84°. Recrystallization of a mixture of benzene and cyclohexane gives colorless prisms; M.P. 87–89°. Several recrystallizations from benzene gives prisms melting at 94–95° C. The 3-(3-methyl-2-butenyl)-4-hydroxy benzoic acid can be purified by dissolving it in a solution of sodium carbonate and extracting with ether. After acidifying the ice cold sodium carbonate solution with hydrochloric acid, the product is collected on a filter and washed with cold water. Recrystallization from a mixture of methanol and water gives colorless needles; M.P. 101–103° C.

A solution of 20.6 g. (0.1 mole) of 3-(3-methyl-2-butenyl)-4-hydroxybenzoic acid in 100 ml. of dry pyridine is treated with 12.8 g. (0.125 mole) of acetic anhydride and kept at room temperature overnight. The reaction mixture is diluted with 400 ml. of ice and water and acidified with concentrated hydrochloric acid. The precipitated product is removed by filtration. The crude product is recrystallized from petroleum ether (B.P. 85–100°) to yield purified 3-(3-methyl-2-butenyl)-4-acetoxy benzoic acid.

A suspension of 24.8 g. (0.1 mole) of 3-(3-methyl-2-butenyl)-4-acetoxybenzoic acid in 50 ml. of water is treated with 40 ml. of 2.5 N sodium hydroxide. The resultant solution is lyophilized to yield a residue of sodium 3-(methyl-2-butenyl)-4-acetoxybenzoate. The sodium salt is added portionwise with stirring at ice temperature to a solution of 127 g. (1 mole) of oxalyl chloride in 400 ml. of dry benzene. After the final addition, stirring is continued for about 2 hours. The precipitated sodium chloride is removed and the filtrate is concentrated at reduced pressure. The residue is redissolved in benzene and reconcentrated to remove last traces of oxalyl chloride from the 3-(3-methyl-2-butenyl)-4-acetoxybenzoyl chloride.

EXAMPLE 2

When 4-acetoxy-3-(3-methylbutyl) benzoyl chloride is reacted with 2,4-dihydroxy-3-methylphenacylamine hydrochloride following the process described in Example 1, N - [4 - acetoxy - 3 - (3 - methylbutyl)-benzoyl] - 2 - hydroxy - 3 - methyl - 4 - (4 - acetoxy - 3 - [3 - methylbutyl]-benzoyloxy)-phenacylamine is obtained.

The starting material, 4-acetoxy-3-(3-methylbutyl)-benzoylchloride can be prepared as follows:

A solution of 3 g. of ethyl 3-(3-methyl-2-butenyl)-4-hydroxybenzoate in 50 ml. of ethanol is hydrogenated over 0.5 g. of platinum oxide catalyst. The theoretical amount of hydrogen is taken up within one hour. After removal of the catalyst by filtration, the alcohol is distilled under reduced pressure. The ethyl 3-(3-methylbutyl-4-hydroxybenzoate is dissolved in 20 ml. of 4 N sodium hydroxide and heated on the steam cone for four hours. After acidification with hydrochloric acid, the mixture is extracted with ether. The ether extract was dried over magnesium sulfate, filtered, and concentrated in vacuo. The residue is dissolved in hot benzene and cyclohexane is added. After cooling the 3-(3-methylbutyl)-4-hydroxybenzoic acid is collected on a filter. Recrystallization from a mixture of chloroform and cyclohexane gives colorless needles; M.P. 108–9° C.

A mixture of 10.4 g. (0.005 mole) of 3-(3-methylbutyl)-4-hydroxybenzoic acid (VI A) and 50 ml. of pyridine is treated with 10 ml. of acetic anhydride. The mixture is kept at room temperature overnight. The mixture is poured into 300 ml. of ice and water. The resultant mixture is acidified to about pH 2 with concentrated hydrochloric acid. The precipitated product is removed and purified by recrystallization from petroleum ether (B.P. 85–100°).

A mixture of 13 g. (0.05 mole) of 3-(3-methylbutyl)-4-acetoxybenzoic acid (VII A) and 50 ml. of thionyl chloride is kept at room temperature overnight. The solution is concentrated at reduced pressure. The residue is dissolved in 50 ml. of dry benzene and reconcentrated at reduced pressure to yield a residue of 3-(3-methylbutyl)-4-acetoxybenzoyl chloride.

EXAMPLE 3

*Preparation of N-carbobenzyloxy-2-hydroxy-3-methyl-4-(carbobenzyloxy)-oxyphenacylamine*

To a cold solution of 2.2 g. of 2,4-dihydroxy-3-methylphenacylamine hydrochloride in 20 ml. of diethylaminobenzene is added 3.4 g. of carbobenzyloxy chloride. After standing overnight, the reaction mixture is evaporated to dryness in vacuo. The residue is recrystallized from ethyl acetate to give N-carbobenzyloxy-2-hydroxy-3-methyl-4-(carbobenzyloxy) oxyphenacylamine as a crystalline compound.

EXAMPLE 4

*N-acetyl-4-acetoxy-3-methyl-2-hydroxyphenacylamine*

To a solution of 2.17 g. of 2,4-dihydroxy-3-methylphenacylamine hydrochloride in 10 ml. pyridine is added 2.04 g. of acetic anhydride. After standing overnight, the solution is evaporated to dryness and the residue is recrystallized from ethyl acetate.

EXAMPLE 5

*Preparation of 3-[4-hydroxy-3-(3-methyl-2-butenyl)-benzamido]-4,7-dihydroxy-8-methylcoumarin*

A solution of 1.5 g. of N-[4-acetoxy-3-(3-methyl-2-butenyl) - benzoyl] - 2 - hydroxy - 3 - methyl - 4 - (4- acetoxy - 3 - [3 - methyl - 2 - butenyl] - benzoyloxy)-phenacylamine in 40 ml. of ethyl carbonate is added to 2.5 g. of powdered sodium. The mixture is warmed on a steam bath for ten minutes, methanol is added to destroy the excess sodium and the product is extracted into 30 ml. of water. The alkaline aqueous solution is allowed to stand at room temperature for two hours. The solution is then acidified to give 3-[4-hydroxy-3-(3-methyl-2-butenyl)-benzamido]-4,7-dihydroxy-8-methylcoumarin.

EXAMPLE 6

*3-[4-hydroxy-3-(3-methylbutyl)-benzamido]-4,7-dihydroxy-8-methylcoumarin*

A solution of 1.5 g. of N-[4-hydroxy-3-(3-methylbutyl) - benzoyl] - 2,4 - dihydroxy - 3 - methylphenacylamine in 40 ml. of ethyl carbonate is added to 2.5 g. of powdered sodium. The mixture is warmed on a steam bath for ten minutes, methanol is added to destroy the excess sodium and the product is extracted into 30 ml. of water. Acidification of the aqueous extract gives 3-[4-hydroxy - 3 - (3 - methylbutyl) - benzamido] - 4,7 - dihydroxy-8-methylcoumarin as a crystalline solid.

EXAMPLE 7

*Preparation of 3-carbobenzyloxyamino-4,7-dihydroxy-8-methylcoumarin*

A solution of 1.5 g. of N-carbobenzyloxy-2-hydroxy-3-methyl-4-(carbobenzyloxy) oxyphenacylamine in 40 ml. of ethyl carbonate is added to 2.5 g. of powdered sodium. This mixture is heated on a steam bath for ten minutes, methanol is added to destroy the excess sodium and the product is extracted into 30 ml. of water. This alkaline solution is allowed to stand two hours at room temperature. Acidification of the solution gives 3-carbobenzyloxyamino-4,7-dihydroxy-8-methylcoumarin as a crystalline compound.

EXAMPLE 8

*3-acetamido-4,7-dihydroxy-8-methylcoumarin*

A solution of 1.5 g. of N-acetyl-4-acetoxy-3-methyl-2-hydroxyphenacylamine in 40 ml. of ethyl carbonate is added to 2.5 g. of powdered sodium. The mixture is warmed on a steam bath for ten minutes, methanol is added to destroy the excess sodium and the product is extracted from the solution into 30 ml. of water. This extract is allowed to stand for three hours at room temperature. Acidification gives 3-acetamido-4,7-dihydroxy-8-methylcoumarin as a crystalline solid.

EXAMPLE 9

*Preparation of 3-[4-hydroxy-3-(3-methylbutyl)-benzamido]-4,7-dihydroxy-8-methylcoumarin*

When N - [4-acetoxy-3-(3-methylbutyl)-benzoyl]-2-hydroxy - 3 - methyl - 4-(4-acetoxy-3-[3-methylbutyl]-benzoyloxy)-phenacylamine is reacted with ethyl carbonate in the presence of sodium in accordance with the processes described in the preceding example, 3-[4-hydroxy-3-(3-methylbutyl)-benzamido] - 4,7 - dihydroxy-8-methylcoumarin is produced.

Various changes and modifications of the invention can be made and, to the extent that such variations incorporate the spirit of this invention, they are intended to be included within the scope of the appended claims.

What is claimed is:

1. The process which comprises intimately contacting 2,4-dihydroxy-3-methylphenacylamine with an acylating agent from the group consisting of acid halides and acid anhydrides of lower fatty acids, 4-acetoxy-3-(3-methyl 2-butenyl)-benzoic acid and 4-acetoxy-3-(3-methylbutyl)-benzoic acid to produce the corresponding N-acyl-2-hydroxy-3-methyl-4-acyloxyphenacylamine.

2. N-acyl - 2 - hydroxy-3-methyl - 4 - acyloxyphenacylamine wherein the acyl group is a member from the group consisting of radicals of a lower fatty acid, 4-acetoxy- 3-(3-methyl-2-butenyl)-benzoic acid and 4-acetoxy-3-(3-methylbutyl)-benzoic acid.

3. The process which comprises intimately contacting 2,4-dihydroxy-3-methylphenacylamine with carbobenzyloxy chloride to product N-carbobenzyloxy-2-hydroxy-3-methyl-4-(carbobenzyloxy) oxyphenacylamine.

4. The process which comprises intimately contacting 2,4-dihydroxy-3-methylphenacylamine with acetic anhydride to produce N-acetyl-4-acetoxy-3-methyl-2-hydroxyphenacylamine.

5. The process which comprises reacting 2,4-dihydroxy-3-methylphenacylamine with 4-acetoxy-3(3-methyl-2-butenyl)-benzoyl chloride to produce N-[4-acetoxy-3-(3-methyl-2-butenyl)-benzoyl] - 2 - hydroxy-3-methyl-4-(4-acetoxy-3-[3-methyl-2-butenyl] - benzoyloxy) - phenacylamine.

6. The process which comprises reacting 2,4-dihydroxy-3-methylphenacylamine with 4-acetoxy-3-(3-methylbutyl)-benzoyl chloride to produce N-[4-acetoxy-3-(3-methylbutyl)-2-hydroxy-3-methyl-4-(4-acetoxy - 3 - [3 - methylbutyl]-benzoyloxy)-phenacylamine.

7. N-carbobenzyloxy - 2 - hydroxy-3-methyl-4-(carbobenzyloxy)oxyphenacylamine.

8. N-acetyl - 4 - acetoxy-3-methyl-2-hydroxy-phenacylamine.

9. N-[4-acetoxy-3-(3-methyl - 2 - butenyl)-benzoyl]-2-hydroxy - 3 - methyl-4-(4-acetoxy-3-[3-methyl-2-butenyl]-benzoyloxy)-phenacylamine.

10. N-[4 - acetoxy - 3 - (3 - methylbutyl)-benzoyl]-2-hydroxy-3-methyl - 4 - (4-acetoxy-3-[3-methylbutyl]-benzoyloxy)-phenacylamine.

References Cited in the file of this patent

Boyd et al.: J. Chem. Soc., pp. 174–6 (1948).